United States Patent
Dobovsek et al.

(10) Patent No.: US 6,642,469 B2
(45) Date of Patent: Nov. 4, 2003

(54) ELECTRODE CLAMPING SYSTEM FOR SINK-TYPE ELECTRICAL DISCHARGE MACHINES

(76) Inventors: Marjan Dobovsek, Teslova 9, 1000 Ljubljana (SI); Mark Otto, Kettejeva 9, 1240 Kamnik (SI); Marina Paradizova, Kettejeva 9, 1240 Kamnik (SI); Boris Mrhar, Izanska 81/A, 1000 Ljubljana (SI); Tomaz Martincic, Vipavska Ulica 30, 1000 Ljubljana (SI)

( * ) Notice: Subject to any disclaimer, the term of this patent is extended or adjusted under 35 U.S.C. 154(b) by 71 days.

(21) Appl. No.: 09/851,448

(22) Filed: May 7, 2001

(65) Prior Publication Data

US 2002/0043519 A1 Apr. 18, 2002

(30) Foreign Application Priority Data

May 8, 2000 (SI) .......................... 200000116

(51) Int. Cl.$^7$ .............................. B23H 1/08; B23H 1/10
(52) U.S. Cl. ................ 219/69.14; 219/69.15; 279/4.06
(58) Field of Search ................ 219/69.15, 69.14; 279/4.06

(56) References Cited

U.S. PATENT DOCUMENTS

| 4,395,613 A | * | 7/1983 | Barr et al. ............... 219/69.15 |
| 4,559,435 A | * | 12/1985 | Gosger ..................... 219/69.14 |
| 4,739,144 A | * | 4/1988 | Shibata et al. ........... 219/69.12 |
| 4,855,558 A | * | 8/1989 | Ramsbro .................. 219/69.15 |
| 4,870,243 A | * | 9/1989 | Wilson et al. ............ 219/69.14 |
| 5,791,803 A | * | 8/1998 | Nordquist ..................... 403/13 |
| 5,906,378 A | * | 5/1999 | Nordquist .................. 279/4.06 |
| 5,909,882 A | * | 6/1999 | Schill ......................... 279/4.04 |
| 6,015,961 A | * | 1/2000 | Lozon et al. ............. 219/69.15 |
| 6,036,198 A | * | 3/2000 | Kramer ...................... 279/133 |
| 6,160,236 A | * | 12/2000 | Nordquist ................ 219/69.15 |

FOREIGN PATENT DOCUMENTS

EP 0 025 231 A1 * 3/1981 ............. B23P/1/08

* cited by examiner

Primary Examiner—M. Alexandra Elve
Assistant Examiner—Kevin P. Kerns
(74) Attorney, Agent, or Firm—Abelman, Frayne & Schwab

(57) ABSTRACT

An electrode clamping system for an EDM-sinking system provides a two-sided dielectric fluid supply to a clamped electrode by placing supply channels in both the fixed and movable parts of the electrode clamping holder. An automatic control circuit controls the flow of the dielectric fluid with reference to a contamination particle concentration in the gap between the electrode and the workpiece, and automatically reduces the flow to a value at which electrode vibrations disappear when changing from rough machining to fine machining.

13 Claims, 5 Drawing Sheets

ELECTRODE CLAMPING SYSTEM FOR SINK-TYPE ELECTRICAL DISCHARGE MACHINES

FIELD OF THE INVENTION

This invention relates to an electrode clamping system or a sink-type or "sinking" electrical discharge machine (EDM) for machining parts.

BACKGROUND OF THE INVENTION

EDM's are used to machine or process a wide variety of parts or workpieces in a number of ways, such as by cutting, forging, injection molding engraving, and polishing, all involving the use of electrical discharges and a dielectric fluid. EDM's of the sink-type, also known as "sinking" EDM's have a sink or well, in which a workpiece to be processed is lowered while it is electrically connected to least one electrode. A dielectric fluid is injected into the electrodes during electrical discharge treatment of the workpiece, such that the dielectric fluid flushes the surface of the workpiece during treatment, in order to remove particles of the workpiece that are cut or machined from the surface of the workpiece during electrical discharge treatment and which would cause contamination of the surface of the workpiece, preventing further fine polishing of the surface if allowed to remain on the surface of the workpiece with the dielectric fluid containing the flushed-away contaminating particles then being collected in the sink.

Holders for clamping electrodes, which are attached to the workpiece during electrical discharge treatment of the workpiece, for sink type EDM's, such as, for example, clamp model numbers 3R-6,51.13, and 3R-658.2E, together with model number 3R-651E-LS, both produced by 3R Company of Sweden, are known in the art, however they do not enable a dielectric fluid supply to flow through them to the electrodes.

Other holders, in which the clamping of electrodes is possible, such as, for example, clamp model number 3R-608,32, in combination with model number 311-601.3, both also produced by 3R Company of Sweden, enable the supply of a dielectric fluid to the electrode through an outer flexible flushing tube, such as model number 3R-103, which is attached to the holder, but does not lead through it. There, the flushing tube must be manually adjusted for every electrode in order to insure that the dielectric fluid flow is in the desired direction. Unfortunately, the flexible tube cannot always be properly positioned due to there being only limited space between the clamping system and the part being machined.

SUMMARY OF THE INVENTION

The electrode clamping system for a sink-type EDM according to the present invention includes an adjustable holder for clamping electrodes of different or adjustable sizes, and a dielectric fluid flow control system. The flow control system provides for lateral flushing of the workpiece with the dielectric fluid, which flows through the adjustable holder.

The construction of the electrode clamping system for a sink-type EDM according to the present invention includes the holder and the control circuit, wherein the holder enables simple clamping of the electrodes and the supply of the dielectric fluid into at least one nozzle, thereby allowing for direction and control of the dielectric fluid flow into a space or slot between the electrode and the workpiece being processed. The supply of the dielectric fluid to the sink-type EDM is enabled by positioning the holder on a head of the EDM and its automatic operation is enabled by mounting the clamping system on the machine head.

The system of the present invention successfully overcomes several technical problems that existed in the state of the art, including those of how to achieve the clamping of electrodes of different or adjustable sizes and how to supply the dielectric fluid for flushing away the contamination particles, produced by the EDM-sinking process, from the gap or slot that exists between the electrode and the workpiece, especially in the case of narrow and/or deep slots.

BRIEF DESCRIPTION OF THE DRAWINGS

A description of the electrode clamping system for a sink-type EDM according to the present invention is presented in detail in the following, in conjunction with reference to the following drawing figures, wherein.

DETAILED DESCRIPTION OF PREFERRED EMBODIMENTS OF THE INVENTION

The electrode clamping system for a sink-type EDM according to the present invention enables the automatic, symmetrical supply of the dielectric fluid from at least two sides of the electrode, through the chambers and nozzles without the need for any intervention by an EDM operator.

Figure 1:
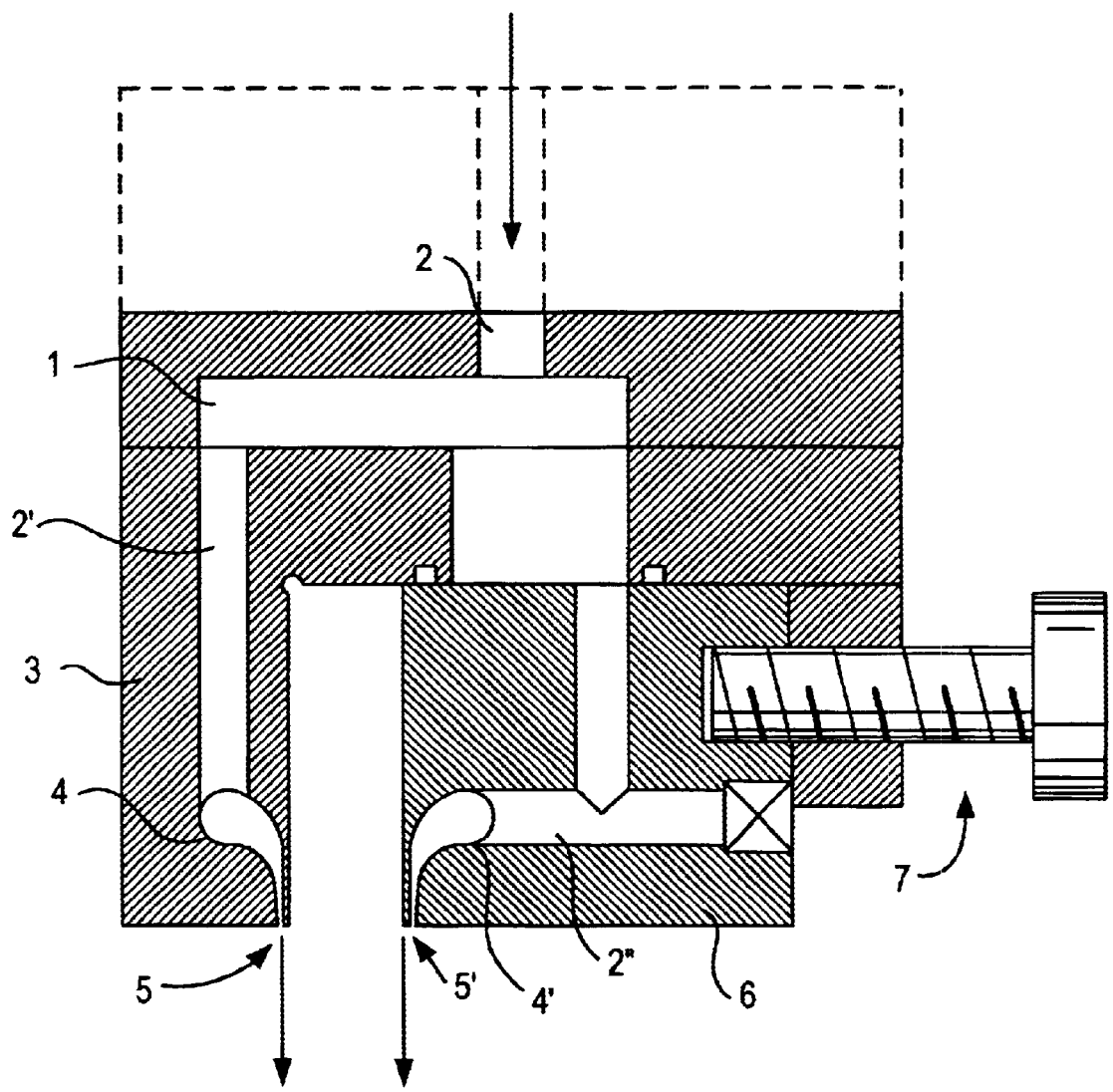
FIG. 1 shows an overall view of one embodiment of the holder according to the present invention, with a sectional view of the dielectric fluid supply.

The electrode clamping system according to the present invention, as shown in FIG. 1, enables clamping of the electrodes of different or adjustable sizes. The holder consists of a basic part 1, where the dielectric fluid feed pipe 2 splits; a holder fixed part, including the dielectric fluid supply channel 2', a chamber 4, and a nozzle 5; and a flexible part 6, including a dielectric fluid supply channel 2', a chamber 4', a nozzle 5', and a button 7, which actuates movement of the flexible part 6 to effect electrode clamping.

According to the present invention, the dielectric fluid supply channels 2, 2', 2" lead through the holder in such a way as to enable delivery of the dielectric fluid supply through a chuck in the head of the machine, and into the chamber on the fixed part 3 and flexible part 6 of the holder, even when a width of a jet of the dielectric fluid is narrower than the electrode width.

Figure 2:
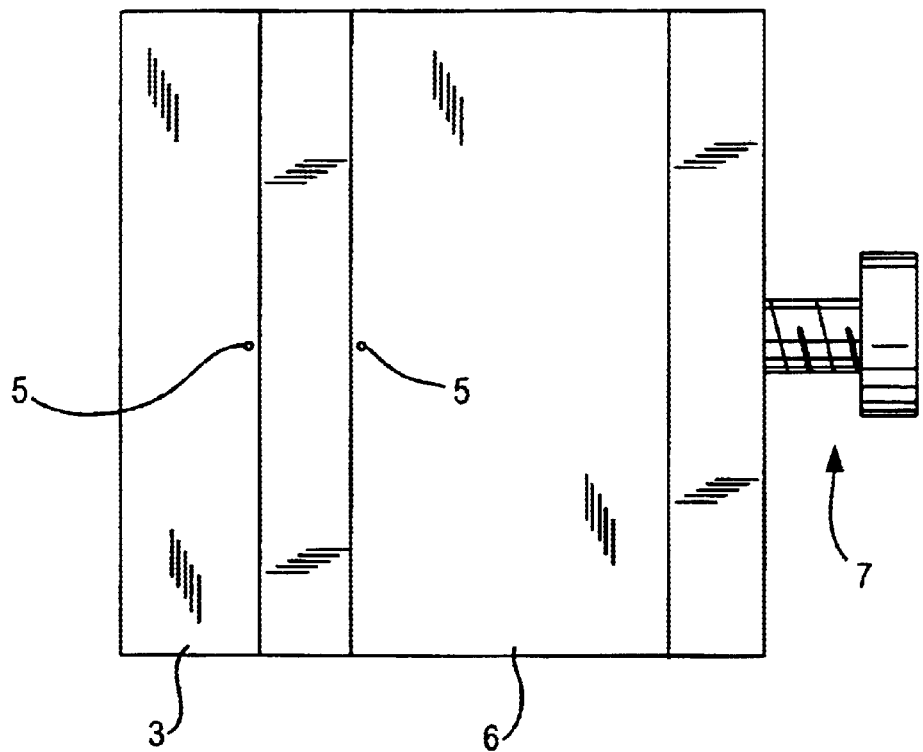
FIG. 2 schematically shows the holder according to FIG. 1, in plan view, as seen from below, in an embodiment utilizing a round-shaped dielectric fluid nozzle.

FIG. 2 shows the holder according to the present invention in plan view, as seen from below, in an embodiment utilizing round dielectric fluid nozzles 5, 5''.

Figure 3:
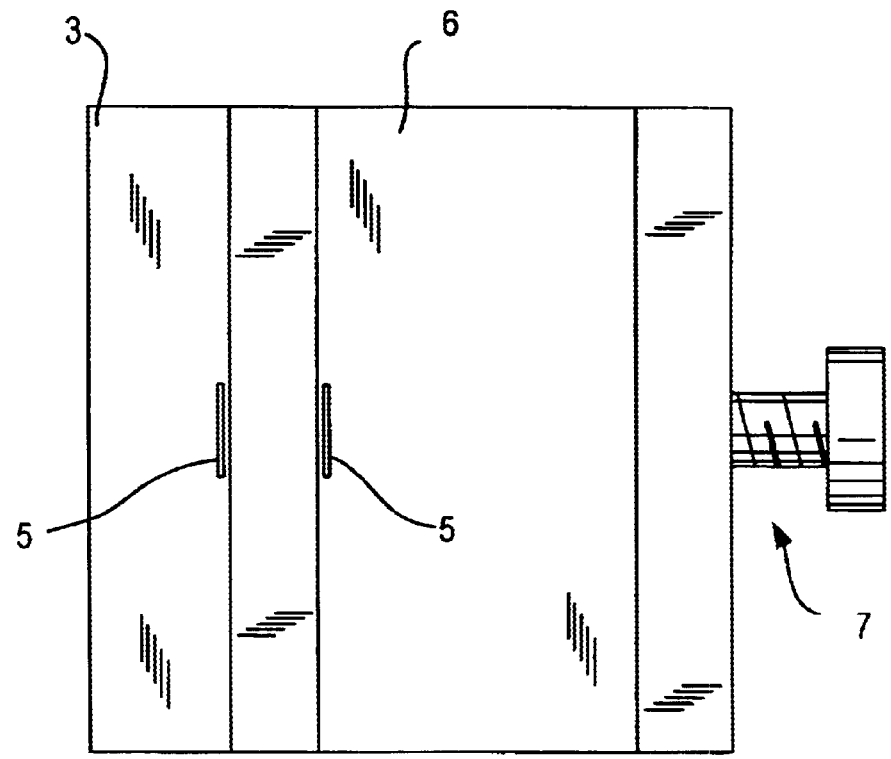
FIG. 3 schematically shows the holder according to FIG. 1, in plain view, as seen from below, in an embodiment utilizing a rectangular-shaped dielectric fluid nozzle.

FIG. 3 shows the holder according to the present invention in plan view, as seen from below, in an embodiment utilizing rectangular dielectric fluid nozzles.

The choice of the particular dielectric fluid nozzle shape depends on the electrode shape and is chosen so as to enable the dielectric fluid supply to flow through the holder at a maximum possible flow velocity from both sides of the electrode.

Figure 4:
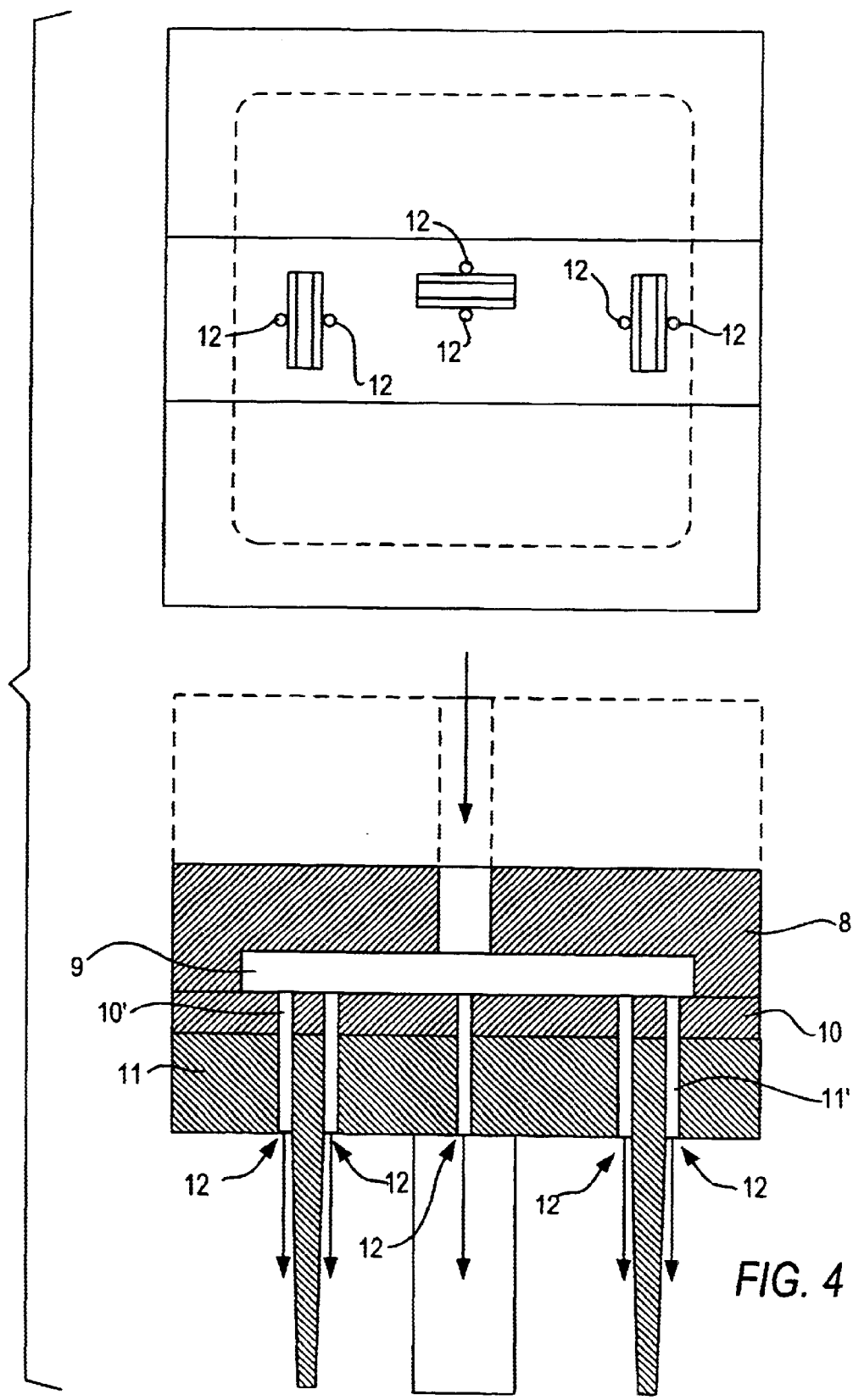
FIG. 4 schematically shows a clamping system according to the present invention, in plan view, as seen from below, and including a multi-nozzled chamber for laterally flushing the workpiece with dielectric fluid.

FIG. 4 shows the clamping system according to the present invention, in plan view, as seen from below and in cross-section.

The chamber 9 in the clamping system 8 is closed by the plate 10 with channels 10'' that also continue through the electrode 11 as channels 11', such as fixed to the plate 10. The dielectric fluid flow enters the chamber 9 and passes through the channels 10' and 11' as far as the nozzles 12. Such positioning of the nozzles allows for the maximum possible effect of lateral flushing with the dielectric fluid.

Figure 5:
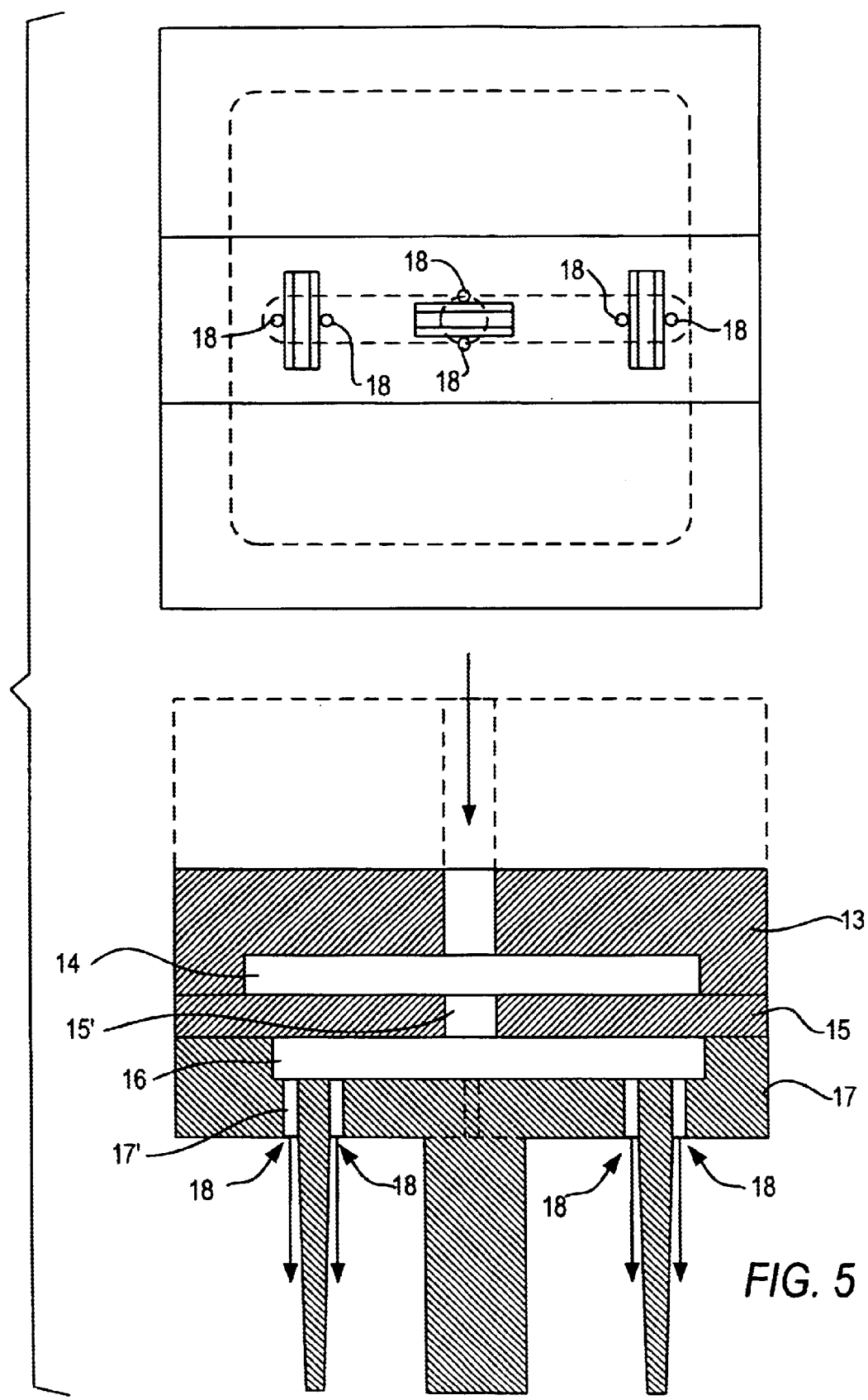
FIG. 5 schematically shows the clamping system according to the present invention, in plan view, as seen from below, and including a multi-nozzled chamber and an additional chamber in the electrode, for laterally flushing the workpiece with dielectric fluid.

FIG. 5 shows the clamping system according to the present invention, in plan view, as seen from below, and in cross-section. In the clamping system 13, the chamber 14 is closed by the plate 15, with a central channel 15' being connected to an additional chamber 16 of the electrode 17. The additional chamber 16 is connected to the nozzles 18 through the channel 17' in the electrode 17. Accordingly, the dielectric fluid flows through the chamber 16, through the central channel 15', through the additional chamber 16 and channels 17' to the nozzles 18, which are also mounted so as to provide for maximum possible effect of lateral flushing with the dielectric fluid.

Figure 6:
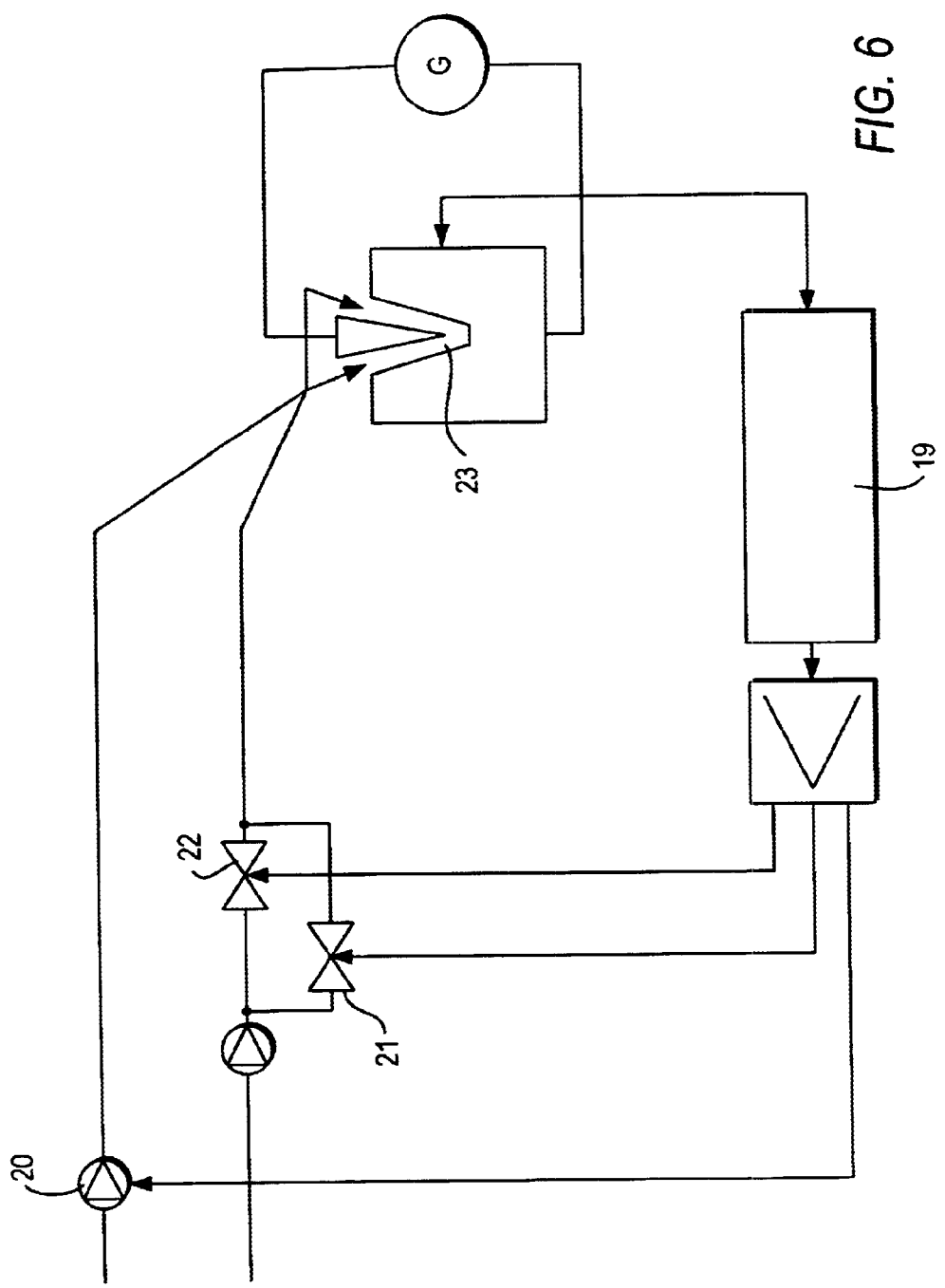
FIG. 6 schematically shows the control circuit for controlling the supply of the dielectric fluid to the holder of the electrode clamping system, according to the present invention.

The control circuit consists of an automatic control part 19 (see FIG. 6), with a corresponding amplifier, and, in one embodiment, a control pump 20, and, in an alternative embodiment, electromagnetic valves 21, 22. The pressure and flowrate of the dielectric fluid are controlled by the automatic control circuit 19, the dielectric fluid flow being determined by the concentration of contamination particles in the gap 23 between the electrode and the part being machined, and regulated alternatively by the control pump 20 in the aforesaid first embodiment, and by the electromagnetic valves 21, 22 in the aforesaid second embodiment. In this way the use of different dielectric flowrates is enabled, with the flowrate being adjustable depending on a number of parameters, such as, for example, the machining depth to with the workpiece is being machined by the EDM powered by the generator G. Both of the foregoing embodiments are shown in FIG. 6.

The EDM is capable of machining or polishing the workpiece to a number of different degrees of coarseness, from rough to fine. The level of polishing can be adjusted during the course of treatment. The amount of dielectric fluid utilized varies according to the level of polishing. At a transition from rough to fine machining by means of the introduction of orbital movement of the electrodes, the dielectric fluid flow generally must be reduced. Excessive dielectric fluid flow causes electrode vibration and overall instability of the EDM. For this reason, at the time of transition from rough to fine machining, the control system 4 automatically reduces the dielectric fluid flow to a level where electrode vibrations caused by too high a dielectric fluid supply cease.

Utilization of the electrode clamping system for a sinking EDM according to the present invention, with an electrode holder and a two-sided, symmetrical supply of dielectric fluid to the EDM enables machining times to be reduced by 50%, as compared to machining without flushing of contamination particles from the surface of the workpiece using a dielectric fluid.

What is claimed is:

1. An electrode clamping system for a sinking electrical discharge machine (EDM), said system comprising an adjustable holder for clamping an electrode, and including at least one chamber for supplying dielectric fluid, with said at least one chamber feeding into and terminating in a plurality of nozzles each of which directs a flow of the dielectric fluid laterally into a gap between the electrode and a workpiece, wherein a dielectric fluid pressure and flow of the dielectric fluid are controlled by an automatic control circuit, the dielectric fluid flow being controlled with reference to a contamination particle concentration in the gap between the electrode and the workpiece.

2. The system of claim 1, wherein when a transition from rough to fine machining is made by the machine, said control circuit automatically reduces the dielectric fluid flow to a value such that electrode vibrations caused by the dielectric fluid supply cease.

3. The system of claim 1, wherein said system includes at least two of said chambers and each of said chambers feeds into and terminates in a corresponding one of said nozzles.

4. The system of claim 3, wherein when a transition from rough to fine machining is made by the machine, said control circuit automatically reduces the dielectric fluid flow to a value such that electrode vibrations caused by the dielectric fluid supply cease.

5. An electrode clamping system for a sinking electrical discharge machine (EDM), said system comprising an adjustable holder for clamping an electrode in a position such that there exists a gap between a clamped electrode and a workpiece to be machined by the EDM, and said holder including:

a basic part having a dielectric fluid feed pipe that splits a supply of dielectric fluid into first and second components;

a fixed part having a first supply channel and a first nozzle, said feed pipe feeding the first component of dielectric fluid into said first supply channel and said first supply channel supplying the first component of dielectric fluid to said first nozzle;

a flexible part having a second supply channel and a second nozzle, said feed pipe feeding the second component of dielectric fluid into said second supply channel and said second supply channel supplying the second component of dielectric fluid to said second nozzle, said first and second nozzles being opposed to each other to provide a lateral symmetrical supply of the dielectric fluid into the gap on both sides of the clamped electrode; and a control for actuating movement of said flexible part in order to clamp an electrode in position between said flexible part and said fixed part.

6. The system of claim 5, said control is a button.

7. The system of claim 5, wherein each of said first and second supply channels includes a respective supply chamber terminating in the respective nozzle, said supply chambers being symmetrical to each other.

8. The system of claim 7, further comprising an automatic control circuit for controlling a pressure of the dielectric fluid and in turn a flow of the dielectric fluid, the flow being controlled with reference to a contamination particle concentration in the gap between the electrode and the workpiece.

9. The system of claim 8, further comprising an automatic control circuit for controlling a pressure of the dielectric fluid and in turn a flow of the dielectric fluid, said control circuit automatically reducing the flow to a value at which vibrations of the clamped electrode caused by the supply of the dielectric fluid disappear at a moment of transition from rough machining to fine machining.

10. The system of claim 7, further comprising an automatic control circuit for controlling a pressure of the dielectric fluid and in turn a flow of the dielectric fluid, said control circuit automatically reducing the flow to a value at which vibrations of the clamped electrode caused by the supply of the dielectric fluid disappear at a moment of transition from rough machining to fine machining.

11. The system of claim 5, further comprising an automatic control circuit for controlling a pressure of the dielectric fluid and in turn a flow of the dielectric fluid, the flow being controlled with reference to a contamination particle concentration in the gap between the electrode and the workpiece.

12. The system of claim 11, further comprising an automatic control circuit for controlling a pressure of the dielectric fluid and in turn a flow of the dielectric fluid, said control circuit automatically reducing the flow to a value at which vibrations of the clamped electrode caused by the supply of the dielectric fluid disappear at a moment of transition from rough machining to fine machining.

13. The system of claim 5, further comprising an automatic control circuit for controlling a pressure of the dielectric fluid and in turn a flow of the dielectric fluid, said control circuit automatically reducing the flow to a value at which vibrations of the clamped electrode caused by the supply of the dielectric fluid disappear at a moment of transition from rough machining to fine machining.

* * * * *